United States Patent [19]

Baker

[11] 4,244,285
[45] Jan. 13, 1981

[54] OVEN

[76] Inventor: James F. Baker, 1727 John Gray Rd., Cincinnati, Ohio 45220

[21] Appl. No.: 67,271

[22] Filed: Aug. 17, 1979

[51] Int. Cl.³ .............................................. A47J 37/04
[52] U.S. Cl. ........................................ 99/339; 99/386; 99/389; 99/400; 99/443 C; 99/443 R; 99/446; 219/388; 219/394
[58] Field of Search ................. 99/443 R, 443 C, 400, 99/446, 339, 386, 389, 391; 126/41 C; 219/388, 393, 394, 395

[56] References Cited

U.S. PATENT DOCUMENTS

| 3,580,164 | 5/1971 | Baker | 99/339 |
| 4,121,509 | 10/1978 | Baker | 99/386 |

FOREIGN PATENT DOCUMENTS

2357178  3/1978  France ........................ 99/386

Primary Examiner—Billy J. Wilhite

[57] ABSTRACT

An oven for cooking and heating foodstuffs comprising an elongated, substantially rectangular, heat insulated housing having an entrance end, an exit end, first and second sides, a top and bottom. The housing interior defines a chamber having a first section adjacent the entrance end, a second intermediate section and a third section adjacent the exit end. A continuous, driven conveyor having an upper cooking flight and a lower return flight is supported at its ends beyond the oven housing entrance and exit ends by sprockets and extends longitudinally throughout all three sections of the oven chamber, the upper cooking flight constituting a continuously moving cooking surface intermediate the height of the oven chamber with means to vary its speed. The first and third sections of the oven chamber have upper and lower radiant heating element assemblies located above and below the upper cooking flight of the conveyor. At a level above the conveyor cooking flight and the upper radiant heating element assemblies of the first and third sections, all three sections have removable stationary cooking surfaces so that the upper portion of the chamber constitutes a stationary oven. The first side of the housing has for each section of the chamber an upper door for access to the stationary oven and a second door for access to the continuously moving cooking surface.

11 Claims, 8 Drawing Figures

OVEN

TECHNICAL FIELD

The invention relates to an oven for cooking and heating foodstuffs and more particularly to such and which has both conveyorized and stationary cooking surfaces.

BACKGROUND ART

The oven of the present invention has many applications both in the restaurant industry and in the food preparation industry. While not intended to be so limited, the oven of the present invention will be described in terms of its application in that segment of the restaurant industry directed to pizza and pizza related products. Prior art workers have devised numerous types of conveyorized ovens. U.S. Pat. No. 1,641,313 teaches a conveyorized bake oven having heating flues above and below the upper flight of the conveyor and a plurality of furnaces below the conveyor capable of burning wood, coal, coke or other suitable fuel. U.S. Pat. Nos. 3,604,336; 3,721,178; 3,815,489 and 4,045,166 all describe conveyorized, gas-fired cooking, broiling or baking ovens. U.S. Pat. No. 3,448,678 teaches a conveyorized cooker employing radiant heating. U.S. Pat. No. 3,681,096 sets forth a conveyorized cooking and heating appliance utilizing electrical heating elements. The appliance has a grid mounted on the top of its heating chamber upon which food can be placed so as to be kept warm. U.S. Pat. No. 4,015,517 teaches a conveyorized food processing device for soft tortillas having an upper storage and dispensing portion for heating and keeping warm toasted tortilla chips.

Prior art workers have also devised apparatus specifically for preparing pizza. An example of such apparatus is set forth in U.S. Pat. No. 3,485,231 wherein a baking oven for frozen pizza and the like is described. The baking oven is provided with a series of trays upon which the pizzas are be placed, the trays following a rectangular path through the oven. U.S. Pat. No. 3,735,692 teaches an automatic pizza making machine having a conveyor belt onto which a pizza dough mixture is dispensed and pressed into discs. The belt conveys the dough discs through various stations which deposit different ingredients thereupon. Finally, the conveyor causes the completed pizzas to pass through a baking oven of predetermined, fixed length and baking time.

The present invention is directed to an improved oven which is simple in construction and which provides both a stationary cooking base and a continuously moving, conveyorized cooking surface located beneath the stationary cooking base. Radiant heating elements are mounted above and below the conveyorized cooking surface such that no additional heating means is required for the stationary cooking surface. The radiant heating elements are so located as to minimize the chances of the operator being burned thereby.

The oven has a high capacity, being equivalent to about six conventional pizza ovens. Despite the fact that the cooking of pizza and the like is critical, the oven is such that the cooking process is completely controlled and requires fewer operators despite its greater capacity.

The provision of both conveyorized and stationary cooking surfaces renders the oven extremely versatile. Complete access to the interior of the oven is afforded both during operation of the oven and for purposes of cleaning and the like. Access to the central portion of the oven is free of radiant heating elements. The stationary heating surface is made up of readily removable horizontal panels. The radiant heating elements may also be easily removed for maintenance or replacement. The oven has easily accessible and removable crumb trays which also serve as heat reflectors for the radientheating elements.

The oven is fully heat insulated throughout, minimizing heat loss to the kitchen, thereby improving the working environment.

DISCLOSURE OF THE INVENTION

According to the invention there is provided an oven for cooking and heating foodstuffs. The oven comprises an elongated, substantially rectangular, heat insulated housing having an entrance end, an exit end, first and second sides, a top and a bottom. The interior of the housing defines a chamber having a first section adjacent the entrance end of the housing, a second intermediate section and a third section adjacent the exit end of the housing. A continuous, driven conveyor, having an upper cooking flight and a lower return flight, is supported at its ends beyond the oven cabinet entrance and exit ends by sprockets and extends longitudinally throughout all three sections of the oven chamber. The upper cooking flight of the conveyor constitutes a continuously moving cooking surface intermediate the height of the oven chamber. Means are provided to vary the speed of the conveyor. In the first and third sections of the chamber, upper and lower radiant heating element assemblies are located above and below the cooking flight of the conveyor. At a level above the cooking flight and the radiant heating elements of the first and third chamber sections, all three chamber sections have removable cooking surfaces so that the upper portion of the chamber constitutes a stationary oven.

The first longitudinal side of the housing is provided with an upper door for each of the chamber sections, giving ready access to the stationary oven. The first side of the cabinet is also provided with a second door for each chamber section. These second door yield access to the continuously moving cooking surface.

Each section of the oven chamber has a crumb tray beneath the moving cooking surface. The crumb trays of the first and third sections also serve as reflectors for the radiant heating element assemblies thereabove.

The oven is completely self contained with a motor for the continuous conveyor and controls for the motor and the radiant heating elements being mounted directly on the oven. The oven may also be provided with a damper controlled exhaust duct, as will be described hereinafter.

BRIEF DESCRIPTION OF THE DRAWINGS

FIG. 7 is a top plan view of one of the upper radiant heating element assemblies.

BEST MODE OF CARRYING OUT THE INVENTION

Figure 1:
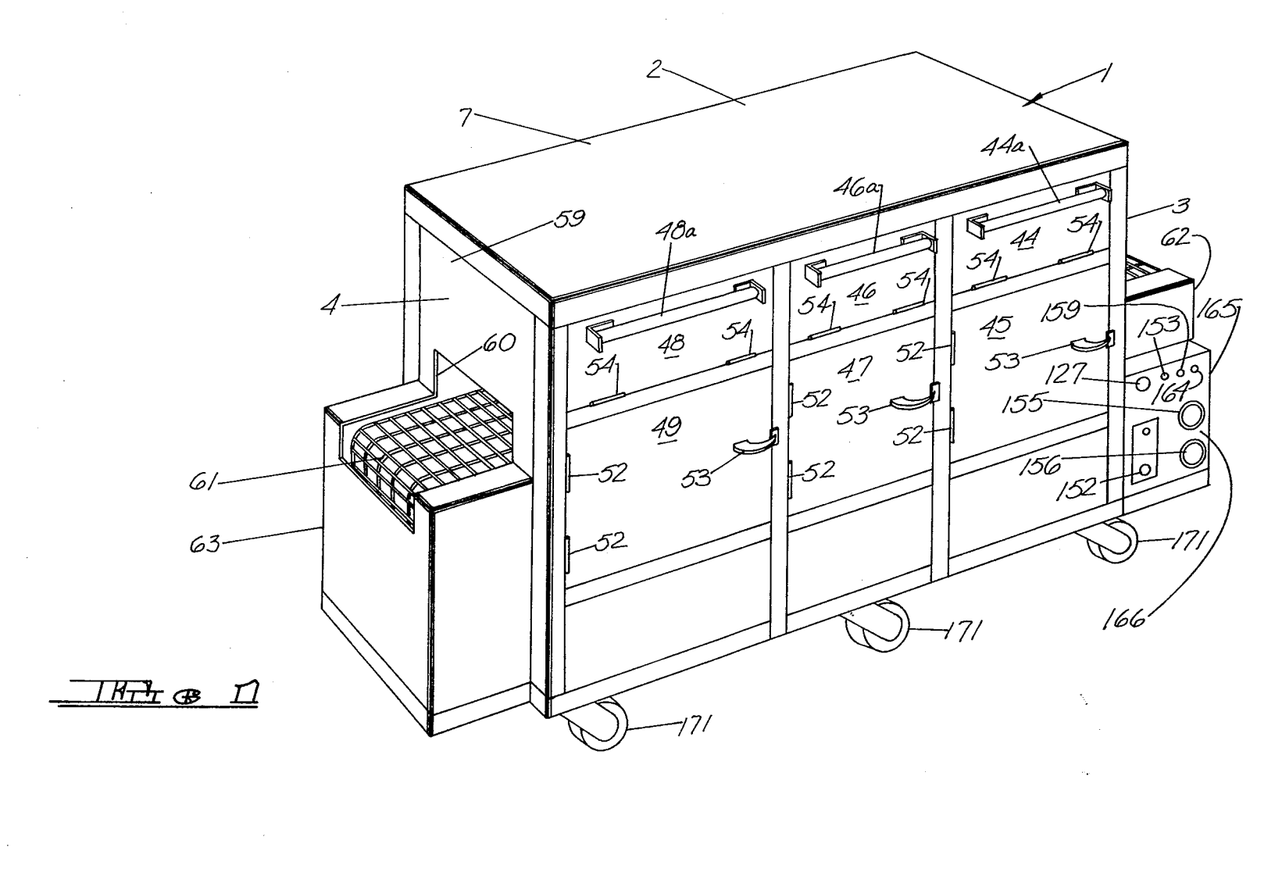
FIG. 1 is a perspective view of the oven of the present invention.
Figure 2:
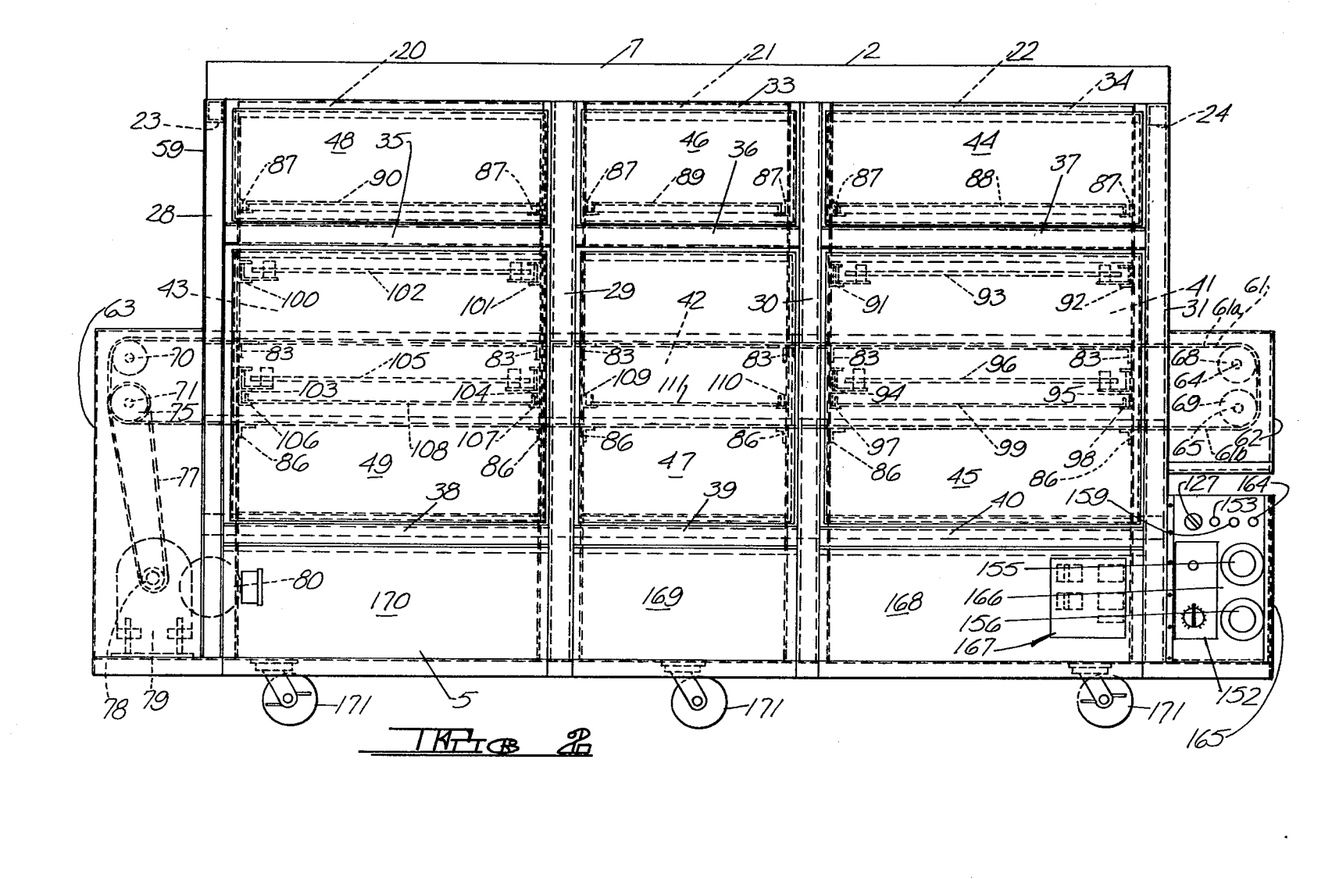
FIG. 2 is a side elevation of the oven of the present invention with certain internal parts indicated in broken lines.
Figure 3:
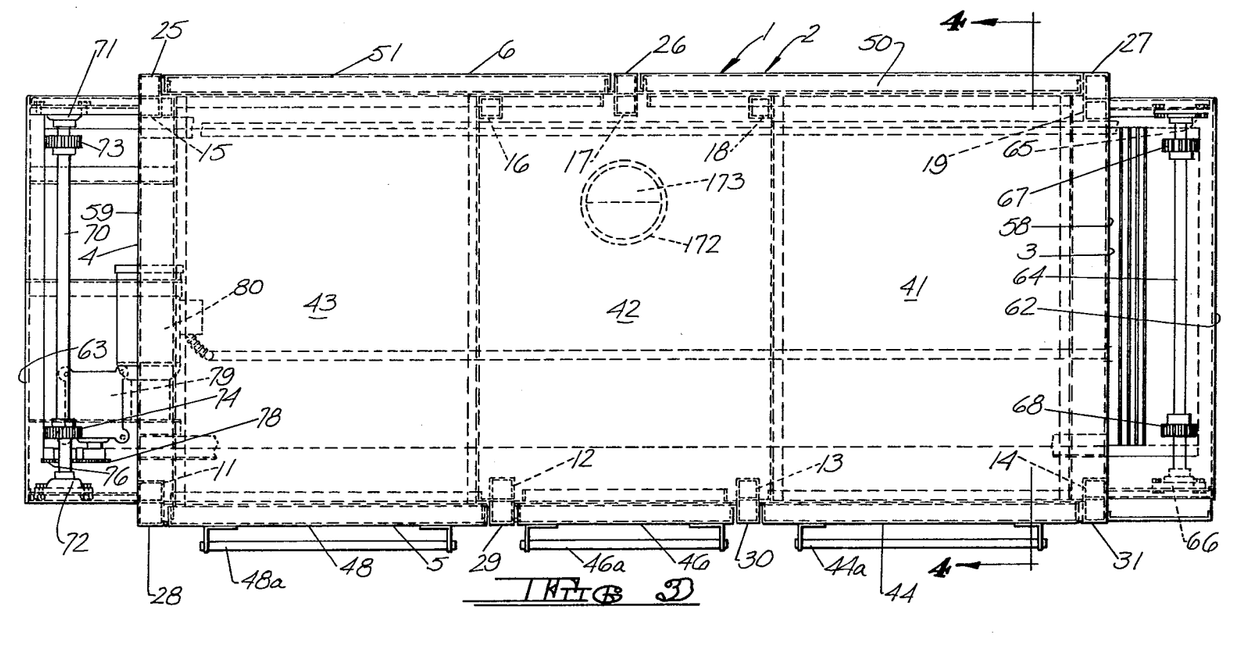
FIG. 3 is a top plan view of the oven of FIG. 1, again with certain internal parts illustrated in broken lines.
Figure 4:
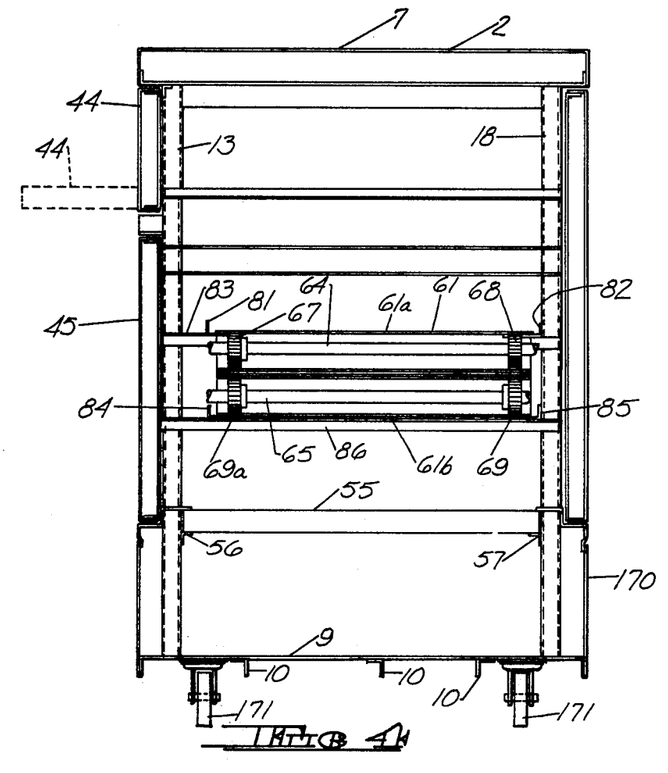
FIG. 4 is a cross sectional view taken along section line 4—4 of FIG. 3.

Reference is made to FIGS. 1 through 4 wherein like parts have been given like index numerals. The oven of the present invention is generally indicated at 1 and comprises an elongated, substantially rectangular housing 2 having an entrance end 3, an exit end 4, a first longitudinal side 5, a second longitudinal side 6, a top 7 and a bottom 8 (FIG. 4). The oven comprises a basic welded framework of black iron or other appropriate material, clad in stainless steel or other surface material suitable for use in a food preparation environment. To this end, the bottom 8 comprises a metallic floor panel 9 reinforced by a plurality of longitudinally extending angle irons 10. Mounted on floor panel 9 are a series of vertical frame members. As best seen in FIG. 3, the side 5 of the housing has four such vertical members 11 through 14. The side 6 of the cabinet has five such members 15 through 19. The vertical frame members 11 through 14 are connected at their upper ends by longitudinally extending frame members 20 through 22, respectively (see FIG. 2). The upper ends of vertical members 15 through 19 are similarly interconnected by horizontal frame members (not shown). In similar fashion, the upper ends of vertical members 11 and 15 are joined by a horizontal brace member 23 (FIG. 2) extending transversely of the cabinet 2. The upper ends of vertical brace members 14 and 19 are also joined by a transverse horizontal member 24.

Returning to FIG. 3, on the housing side 6, the vertical frame members 15, 17 and 19 support stainless steel door frame members 25 through 27, respectively. In similar fashion, on side 5 of the housing 2, vertical brace members 11 through 14 support vertical stainless steel door frame members 28 through 31. As is most clearly shown in FIG. 2, the vertical stainless steel door frame members 28 through 31 are joined by a plurality of horizontal door frame members 32 through 40. Similar horizontal door frame members (not shown) will appropriately be provided between vertical door frame members 25 through 27 of housing side 6.

The chamber defined by housing 2 is made up of three sections. The first section 41 (see FIG. 3) is adjacent the entrance end of housing 2 and is bounded by vertical frame members 13, 14, 18 and 19. A second, somewhat smaller, intermediate section 42 is bound by vertical frame members 12, 13, 16 and 18. A third section 43, similar to first section 41 and adjacent exit end 4, is bounded by vertical frame members 11, 12, 15 and 16.

As can most clearly be seen in FIG. 2, the housing side 5 has an upper door 44 and a lower door 45 for the first section 41. Similarly, the side 5 has an upper door 46 and a lower door 47 for intermediate section 42 and an upper door 48 and a lower door 49 for third section 43.

While it would be within the scope of the invention to simply enclose side 6 of housing 2 with one or more permanent stainless steel panels, in the embodiment illustrated (see FIGS. 3 and 4) the side 6 is provided with two large doors 50 and 51. These two doors, in combination with doors 44 through 49 on side 5, provide full access to the entire interior chamber of housing 2. The doors 44 through 49 of housing side 5 and 50 and 51 of housing side 6 are of hollow construction and are filled with appropriate heat insulative material.

As shown in FIG. 1, the lower doors 45, 47 and 49 of housing side 5 are hinged along one vertical edge as at 52 and are provided with conventional latch means 53. The doors 50 and 51 of housing side 6 are similarly hinged along one vertical side and provided with conventional latch means (not shown). The upper doors 44, 46 and 48 of FIG. 2 are hinged along their bottom edges, as at 54 and are adapted to swing downwardly. In FIG. 4, door 44 is illustrated in its open position in broken lines. In all of FIGS. 2, 3 and 4, the latches and hinges of the doors have been eliminated for purposes of clarity.

To complete the chamber of housing 2, a lower horizontal, metal clad insulative panel 55 is supported on a pair of angle irons 56 and 57 (FIG. 4). Angle iron 56 is welded or otherwise appropriately affixed to vertical frame members 11 through 14. Angle iron 57 is mounted on vertical frame members 15 through 19. Panel 55 serves as the floor of the heating chamber. The top 7 of the cabinet constitutes a stainless steel clad insulative panel mounted on the basic framework. The oven in also provided with stainless steel end panels 58 and 59. The end panels are provided with openings for the conveyorized cooking surface next to be described. Such an opening is shown at 60 in end panel 59. End panel 58 at entrance end 3 of the cabinet will have a similar opening (not shown).

Reference is now made to FIGS. 2 and 3. The oven of the present invention is provided with an endless conveyor 61. The conveyor may constitute a stainless steel wire mesh belt or the like and has an upper flight 61a constituting a continuously moving cooking surface and a lower return flight 61b. The housing 2 is provided with an extension 62 at its entrance end and another extension 63 at its exit end. Extension 62 supports a pair of idler shafts 64 and 65. Idler shaft 64 is clearly shown in FIG. 3 mounted in suitable bearings 65 and 66. Shaft 64 carries a pair of sprockets 67 and 68. Shaft 65 is similarly mounted in appropriate bearing means (not shown) and carries a pair of sprockets, 69 and 69a (see FIG. 4).

Extension 63 similarly houses a pair of shafts 70 and 71. Shaft 70 is shown in FIG. 3 mounted in suitable bearing means 71 and 72 and carrying a pair of sprockets 73 and 74. Shaft 71 is similarly mounted in appropriate bearing means (not shown) and carries a pair of sprockets, (not shown). The conveyor 61 is supported by and extends about the sprockets on shafts 64, 65, 70 and 71. The shaft 71 is provided with an additional sprocket 76 connected by a roller chain or the like 77 to a sprocket 78 on a speed reducer 79. The speed reducer 79, in turn, in driven by an electric motor 80.

The edges of the upper flight 61a of conveyor 61 are supported by angle irons 81 and 82 (see FIG. 4) appropriately affixed to angle irons 83 extending transversely of the chamber (see also FIG. 2). In similar fashion, the longitudinal edges of the lower flight 61b of conveyor 61 are supported by angle irons 84 and 85 extending longitudinally of the chamber and mounted on angle irons 86 extending transversely of the chamber.

The upper portion of the chamber of housing 2 is provided with additional transversely extending angle irons 87. Facing pairs of these angle irons support stainless steel pans 88, 89 and 90 located in sections 41, 42 and 43, respectively. The stainless steel pans 88, 89 and 90 are readily removable and constitute stationary cooking and heating surfaces.

Reference is again made to FIG. 2. The first section 41 of the oven chamber has a first pair of facing channel members 91 and 92 extending transversely thereof. The channel members 91 and 92 support an upper radiant heating element assembly 93. The section 41 has a second set of facing channel members 94 and 95 which support a lower radiant heating element assembly 96. It will be noted that the upper radiant heating element assembly 93 is located above the upper flight 61a of conveyor 61 and beneath the stationary cooking surface 88. The lower radiant heating element assembly 96 is located beneath upper flight 61a and above lower flight 61b of conveyor 61. Beneath the lower radiant heating element assembly 96 and above lower conveyor flight 61b the section 41 has a facing pair of angle irons 97 and 98 extending transversely thereof and supporting a removable crumb tray 99. The crumb tray may be made of stainless steel or other appropriate material and serves additionally as a reflector for radiant heating element assembly 96. The third section 43 of the oven chamber has a first pair of transversely extending channel members 100 and 101 supporting an upper radiant heating element assembly 102. A second pair of transversely extending channel members 103 and 104 support a lower radiant heating assembly 105. Upper and lower radiant heating element assemblies 102 and 105 are identical to upper and lower radiant heating element assemblies 93 and 96 of first chamber section 41, and will be described in greater detail hereinafter. Immediately below radiant heating element assembly 105 the third section 43 of the chamber is provided with another pair of transversely extending angle irons 106 and 107 supporting a removable crumb tray 108 substantially identical to crumb tray 99 of first section 41.

The intermediate section 42 is not provided with radiant heating element assemblies. It is, however, provided with a pair of transversely extending angle irons 109 and 110 supporting a crumb tray 111 similar to crumb trays 99 and 108.

Figure 5:
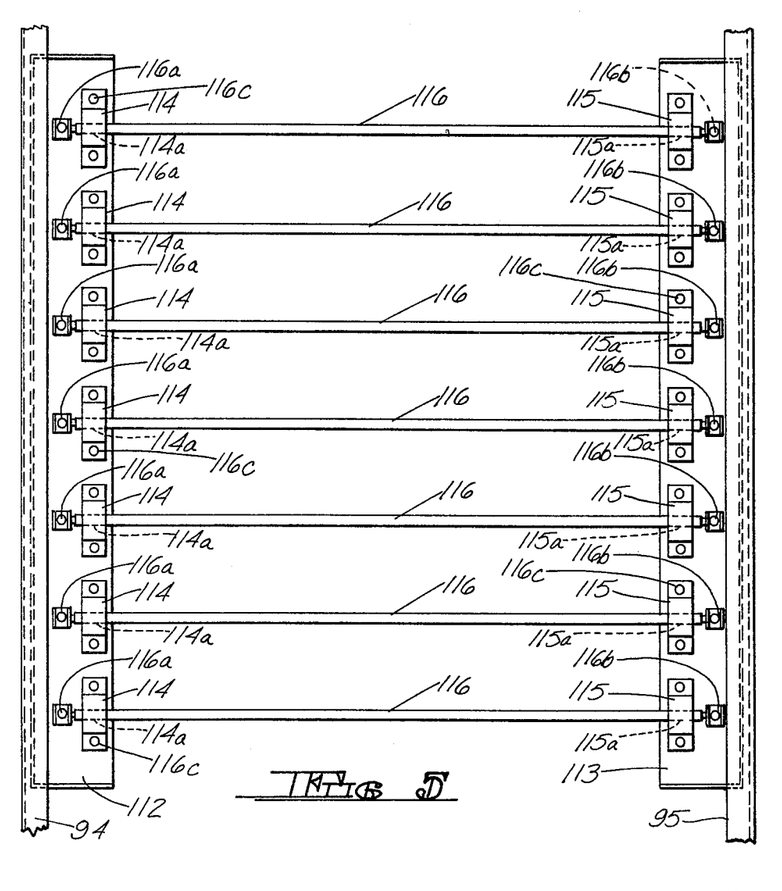
FIG. 5 is a top plan view of one of the bottom radiant heating element assemblies.
Figure 6:
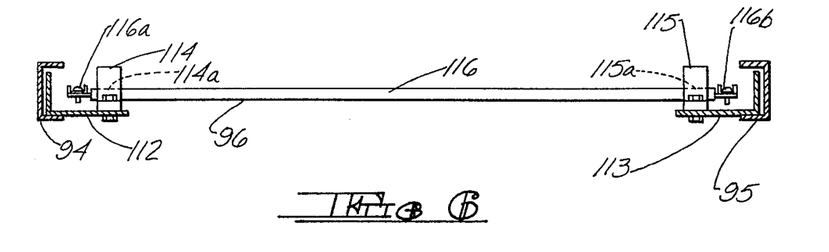
FIG. 6 is an end elevational view of the radiant heating element assembly of FIG. 5.

In FIGS. 5 and 6, lower radiant heating element assembly 96 is shown. The radiant heating element assembly 96 is identical to radiant heating element assembly 105 and a description of one can stand as a description of the other. In FIGS. 5 and 6, the channel members 94 and 95, extending transversely of oven section 41, are shown. The channel members 94 and 95 support the radiant heating element assembly 96 which comprises a pair of angle supports 112 and 113. On the horizontal legs of angle supports 112 and 113 there are mounted a plurality of identical electrically insulative supports 114 and 115. The supports 114 and 115 may be affixed to the horizontal leg of their respective one of angle supports 112 and 113 by bolts 116 or other suitable fastening means. Each insulative support 114 and 115 has a transverse perforation 114a and 115a, respectively, passing therethrough. Each opposed pair of insulative supports 114-115 has extending through their perforations 114a and 115b a conventional sheathed resistance wire radiant heating element 116 provided with terminals 116a and 116b by which it may be connected to the oven circuitry. As indicated above, the radiant heating elements 116 are conventional and excellent results have been achieved, for example, through the use of such heating elements manufactured by Wiegant Company, of Pittsburgh, Pa., under the mark Chromalox and the designation #RTU-3113A. It will be evident from FIGS. 5 and 6 that when properly disconnected from the oven circuitry, the entire radiant heating element assembly 96 may be removed from the oven as a unit for maintenance or repair by sliding the assembly out from between channel members 94 and 95.

FIG. 7 illustrates the upper radiant heating element assembly 93 of oven section 41. This assembly is identical to the upper radiant heating element assembly 102 of oven section 43. In FIG. 7 channel members 91 and 92 are shown. The radiant heating element assembly 93 comprises a pair of angle supports 117 and 118, substantially identical to supports 112 and 113. Angle supports 117 and 118 each carry a plurality of electrically insulative supports 119 and 120 which are identical to supports 114 and 115 of FIGS. 5 and 6. Each opposed pair of supports 119-120 mounts a radiant heating element 121 which may be identical to the radiant heating elements 116. Each radiant heating element 121 is provided with terminals 121a and 121b at its ends.

The primary difference between the upper radiant heating element assembly 93 and the lower radiant heating element assembly 96 lies in the number of radiant heating elements provided. The upper radiant heating element assembly has fewer radiant heating elements than does the lower radiant heating element assembly. In the exemplary embodiment of the oven being described, since pizzas or other foodstuffs in pans or other vessels will be placed on the upper flight 61a of conveyor 61, more heating elements are located beneath the flight to accommodate for the vessel containing the foodstuff and the mosit dough, for example, in the case of the pizza.

Figure 8:
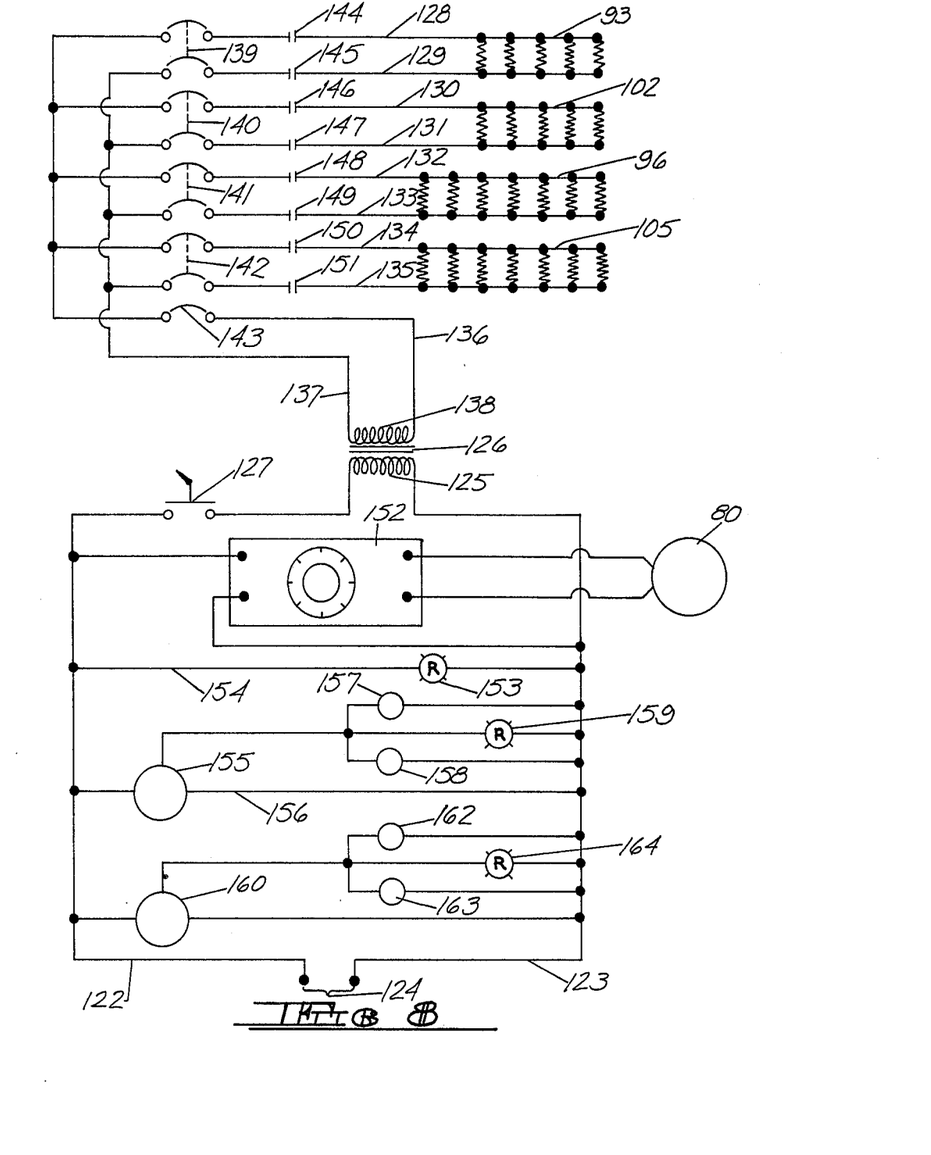
FIG. 8 is an electrical diagram of the oven of the present invention.

Reference is now made to FIG. 8 which constitutes an electrical diagram for the oven of the present invention. In the diagram of FIG. 8 the upper radiant heating element assembly 93 and 102 are shown together with the lower radiant heating element assemblies 96 and 105. The diagram also shows electric motor 80 which, through the agency of speed reducer 79, drives conveyor 61. FIG. 8 illustrates a pair of leads 122 and 123 connected across a source of current 124. The leads 122 and 123 are connected to the primary 125 of a step-up transformer 126. Lead 122 also contains the main power on-off switch 127.

Leads 128 and 129 from upper radiant heating element assembly 93 together with leads 130 and 131 from upper radiant heating element assembly 102, leads 132 and 133 from loer radiant heating element assembly 96 and leads 134 and 135 from lower radiant heating element assembly 105 are connected across leads 136 and 137 of the secondary 138 of step-up transformer 126. To protect the elements, all of leads 128 through 135 and lead 136 contain circuit breakers 139 through 143, respectively. The leads 128 through 135 to the radiant energy heating element assemblies further contain relay coil contacts 144 through 151, respectively.

Turning to the lower portion of the diagram of FIG. 8, a conventional speed control device 152 is connected across leads 122 and 123. The electric motor 80 is connected to speed control device 152, as shown. By varying the setting of the speed control device 152, the speed of motor 80 and therefor the speed of conveyor 61 can be varied.

A power-on light 153 is connected by lead 154 across leads 122 and 123. The power-on light 153 will be illuminated so long as the leads 122 and 123 are connected to power source 124.

A percentage timer 155 is connected by lead 156 across leads 122 and 123. The percentage timer 155 controls the upper radiant heating element assemblies 93 and 102 through the agency of relay coils 157 and 158 connected between percentage timer 155 and lead 123. Relay coil 157 cooperates with relay coil contacts 144 and 145 in leads 128 and 129 of upper radient energy heating element assembly 93. Similarly, relay coil 158 cooperates with relay coil contacts 146 and 147 in leads 130 and 131 of upper radiant energy heating element assembly 102. An upper heaters-on light 159 is connected between percentage timer 155 and lead 123 and is illuminated whenever upper radiant heating element assemblies 93 and 102 are on.

To complete the circuitry, a second percentage timer 160, controlling lower radiant energy heating element assemblies 96 and 105 is connected across leads 122 and 123 by lead 161. A relay coil 162 is connected between percentage timer 160 and lead 123 and cooperates with relay coil contacts 148 and 149 in the leads 132 and 133 of lower radiant energy heating element assembly 96. A second relay coil 163 is connected between percentage timer 160 and lead 123 to cooperate with relay coil contacts 150 and 151 and the leads 134 and 135 of lower radiant energy heating element assembly 105. Finally, a lower heaters-on light 164 is connected between percentage timer 160 and lead 123 and is illuminated whenever lower radiant energy heating element assemblies 96 and 105 are on.

FIG. 2 illustrates a second extension 165 of cabinet 2 at the entrance end thereof. The extension 165 comprises a box-like structure containing the various electrical controls for the oven. That side of extension 165 visible in FIG. 2 constitutes a control panel 166. The control panel contains the main power on switch 127, the speed control device 152, the percentage timers 155 and 160, the power-on light 153, the upper heaters-on light 159 and the lower heaters-on light 164. Thus, all of the controls are readily accessible to the operator of the oven.

Near control panel 165 and beneath the horizontal insulated panel 55, the circuit breakers 139 through 143 are located, the circuit breakers are generally indicated in FIG. 2 at 167. The side 5 of the oven may be provided with removable panels 168, 169 and 170 for access to that lower portion of the oven between the horizontal insulated panel 55 and metallic floor panel 9. The side 6 of the oven may be provided with similar removable panels, one of which is shown at 170 in FIG. 4. To complete the structure, the cabinet 2 may be mounted on locking caster, some of which are shown at 171 in FIGS. 2 and 4.

The oven having been described in detail, its operation may be set forth as follows. Foodstuffs mounted on the upper cooking flight 61a of conveyor 61 are heated or cooked by some convection, some conduction through the vessel in which they are located, but primarily by radiant heat from the upper and lower radiant heating element assemblies 93, 102, 96 and 105. Foodstuffs in the stationary cooking base portion of the oven, resting upon cooking surfaces 88, 89 or 90 are heated or cooked primarily be convection and conduction. The stationary cooking surfaces 88, 89 and 90 are spaced from each other and from the adjacent vertical surfaces of the oven by an amount sufficient to permit cooking by convection.

Pizza, casseroles and the like may be placed on the upper cooking flight 61a of conveyor 61 at the entrance end of cabinet 2. It has been found that the ordinary 12 inch pizza can be throughly cooked in an oven of the type taught herein in as little as 8 minutes. Thick shelled pizzas cook even faster. To shorten the cooking time of a thick shelled pizza, the pizza may be inserted from the entrance end of the oven and shoved partway along the conveyor to a starting position within the oven. In this way, thick and thin shelled pizza and other foodstuffs can be cooked on the upper flight 61a of conveyor 61 simultaneously. For foodstuffs which cook even more rapidly, easy access can be gained to any part of the upper flight 61a of conveyor 61 by means of doors 45, 47 and 49. In most instances, the door 47 in the intermediate section 42 of the oven will be used since the intermediate section of the oven is free of upper and lower radiant heating element assemblies. While pizzas, casseroles and the liked are being cooked on the upper flight 61a of conveyor 61, the stationary cooking surfaces 88, 89 and 80 may be simultaneously used to heat or cook other foodstuffs. Ready access to these heating or cooking surfaces is gained through doors 44, 46 and 48. These doors may be opened and closed through the agency of door handles 44a, 46a and 48a shown in FIG. 3. The stationary heating or cooking surfaces 88, 89 and 90 may be used to cook or heat a myriad of foodstuffs such as bread, pasta, sandwiches or the like, or to melt cheese over a casserole dish.

As can be seen from the above description, the oven of the present invention offers the operator safety, convenience and versatility not hitherto achieved by commercial restaurant and food preparation ovens. The operator is provided with a full complement of readily accessible controls and the oven has an unusually large capacity. Since the oven is fully insulated, it eliminates a large amount of heat from the kitchen, thereby improving the working environment.

Modifications may be made in the invention without departing from the spirit of it. For example, the first extension 62 at the entrance end of the oven, together with the conveyor 61 can be increased in length to provide a greating loading area of the conveyor belt. Similarly, the extension 63 and conveyor belt 61 can be lengthened at the exit end of the oven and can be designed to discharge the foodstuff from the upper flight 61a of conveyor 61 onto a table, another conveyor or the like.

It is within the scope of the invention to provide the oven with an exhaust conduit. Such a conduit is illustrated in broken lines in FIG. 3 at 172. The exhaust conduit 172 may be provided with a damper 173 which may be so adjusted as to minimize the escape of heat from the entrance and exit ends of the oven.

What is claimed is:

1. An oven for cooking and heating foodstuffs comprising an elongated, substantially rectangular, heat insulated housing having an entrance end and an exit end, first and second longitudinal sides, a top and a bottom, the interior of said housing defines a chamber having a first section adjacent said housing entrance end, a second intermediate section and a third section adjacent said housing exit end, a continuous conveyor having an upper horizontal cooking surface flight and a lower horizontal return flight extends longitudinally through all of said chamber sections and through openings in said housing entrance and exit ends, said conveyor being supported on sprockets located beyond said housing entrance and exit ends, said upper cooking flight comprising a continuously moving cooking surface intermediate the height of said chamber, means to drive said conveyor, an upper and a lower radiant heating element assembly located respectively above and below said upper cooking flight of said conveyor in each of said chamber first and third sections, a stationary cooking and heating surface in each of said chamber sections located at a level above said conveyor upper cooking flight and above said upper radiant heating element assemblies in said first and third chamber sections, said first housing side having an upper door for each chamber section for access to said stationary cooking surface therein and a lower door for each chamber section for access to said conveyor upper cooking flight passing therethrough.

2. The structure claimed in claim 1 including means to vary the speed of said conveyor.

3. The structure claimed in claim 1 including a horizontal crumb tray mounted in each of said chamber sections at a level above said conveyor return flight and below said lower radiant heating element assemblies in said first and third chamber sections, each of said crumb trays being removable from its respective chamber through said lower door therefor.

4. The structure claimed in claim 1 including doors in said second longitudinal side of said housing for access to said chamber.

5. The structure claimed in claim 1 including control means for each of said upper and lower radiant heating element assemblies.

6. The structure claimed in claim 1 including an exhaust duct in said top of said housing and an adjustable damper in said exhaust duct such that adjustment of said damper will minimize heat loss through said openings in said housing entrance and exit ends.

7. The structure claimed in claim 1 wherein each of said upper and lower radiant heating element assemblies comprises a plurality of elongated, rigidly sheathed resistance wires in parallel spaced relationship, the ends of each of said heating elements being mounted in electrically insulative supports, said supports, in turn, being mounted on a pair of metallic angle irons in parallel spaced relationship, said chamber having a pair of channel members for each of said radiant heating element assemblies, each of said pairs of channel members extending transversely across said chamber and being so spaced as to receive said angle irons of its respective radiant heating element assembly with a sliding fit such that said radiant heating element assembly can be readily removed from said chamber for maintenance and repair.

8. The structure claimed in claim 7 wherein said lower radiant heating element assemblies have a greater number of heating elements than said upper radiant heating element assemblies.

9. The structure claimed in claim 7 including control means for each of said upper and lower radiant heating element assemblies.

10. The structure claimed in claim 7 including means to vary the speed of said conveyor.

11. The structure claimed in claim 10 including a horizontal crumb tray mounted in each of said chamber sections at a level above said conveyor return flight and below said lower radiant heating element assemblies in said first and third chamber sections, each of said crumb trays being removable from its respective chamber through said lower door therefor.

* * * * *